United States Patent
Purcell et al.

(10) Patent No.: US 7,792,922 B2
(45) Date of Patent: Sep. 7, 2010

(54) SYSTEMS AND METHODS FOR MANAGING HEALTH OF A CLIENT SYSTEM

(75) Inventors: Greg R. Purcell, East Peoria, IL (US); Steven G. Yarnot, Peoria, IL (US); Anthony Hobson, Avully (CH)

(73) Assignee: Caterpillar Inc., Peoria, IL (US)

( * ) Notice: Subject to any disclaimer, the term of this patent is extended or adjusted under 35 U.S.C. 154(b) by 209 days.

(21) Appl. No.: 12/042,717

(22) Filed: Mar. 5, 2008

(65) Prior Publication Data
US 2009/0228519 A1 Sep. 10, 2009

(51) Int. Cl.
G06F 15/173 (2006.01)
G06F 17/30 (2006.01)

(52) U.S. Cl. ........................ 709/217; 709/224; 709/203; 709/219; 709/239; 709/227; 709/228; 709/229; 707/999.01

(58) Field of Classification Search ................. 709/201, 709/203, 231, 217, 219, 224–229, 239
See application file for complete search history.

(56) References Cited

U.S. PATENT DOCUMENTS

| 5,796,942 | A | 8/1998 | Esbensen |
|---|---|---|---|
| 6,269,447 | B1 | 7/2001 | Maloney et al. |
| 6,742,128 | B1 | 5/2004 | Joiner |
| 6,941,467 | B2 | 9/2005 | Judge et al. |
| 6,980,927 | B2 | 12/2005 | Tracy et al. |
| 7,086,089 | B2 | 8/2006 | Hrastar et al. |
| 7,096,502 | B1 | 8/2006 | Fox et al. |
| 7,114,183 | B1 | 9/2006 | Joiner |
| 7,150,044 | B2 | 12/2006 | Hoefelmeyer et al. |
| 7,152,240 | B1 | 12/2006 | Green et al. |
| 7,162,742 | B1 | 1/2007 | Flowers et al. |
| 7,168,093 | B2 | 1/2007 | Hrabik et al. |
| 7,185,368 | B2 | 2/2007 | Copeland, III |
| 7,213,260 | B2 | 5/2007 | Judge |
| 7,225,466 | B2 | 5/2007 | Judge |
| 2007/0271375 | A1* | 11/2007 | Hwang ........................ 709/224 |
| 2008/0183564 | A1* | 7/2008 | Tien et al. ..................... 705/11 |

* cited by examiner

Primary Examiner—Jude J Jean Gilles
(74) Attorney, Agent, or Firm—Leydig, Voit & Meyer

(57) ABSTRACT

A method and system for monitoring the health of a networked client computer node include health service agent software that scans the client computer node upon which the agent is installed. The health service agent software transmits data to a health service data manager identifying the type of client node upon which the agent is installed to permit retrieval by the manager of a health service task list specifying rules and executables applied by the health service agent to an associated client node.

21 Claims, 3 Drawing Sheets

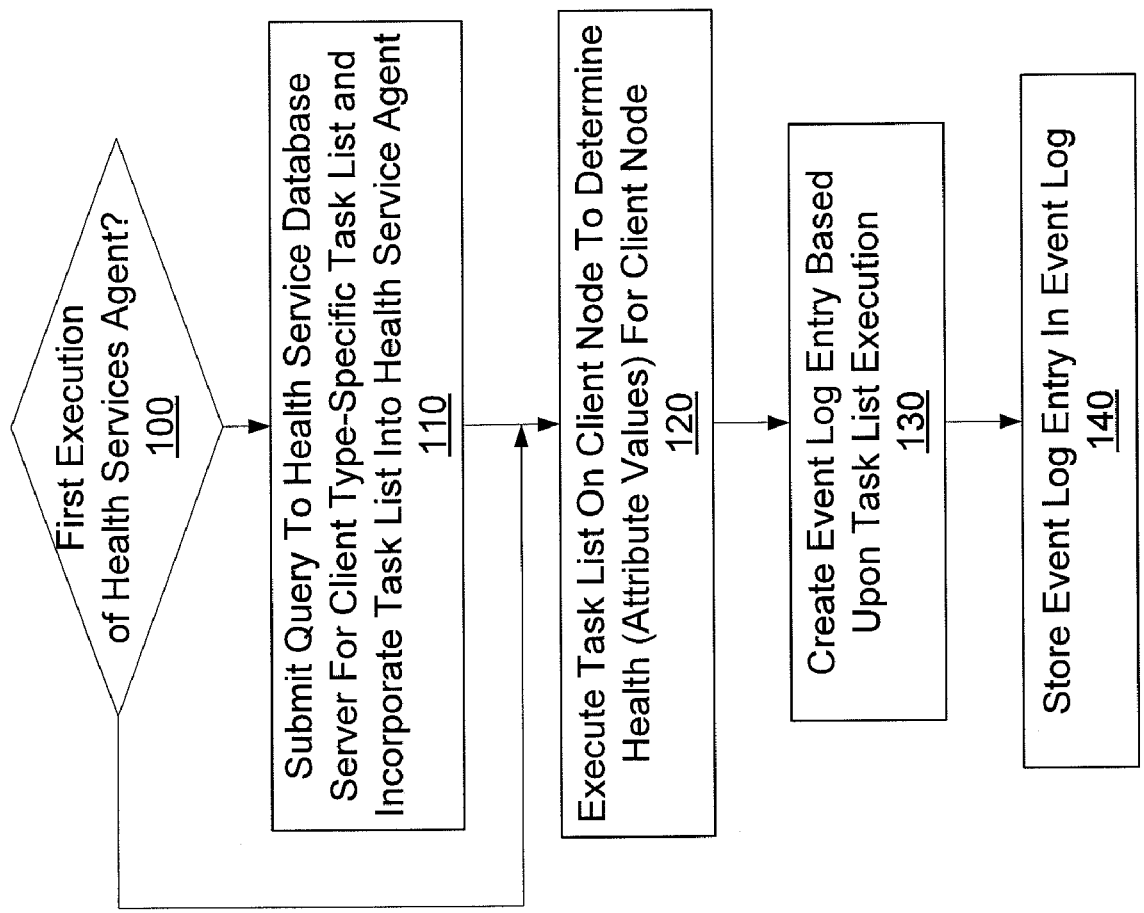

SYSTEMS AND METHODS FOR MANAGING HEALTH OF A CLIENT SYSTEM

TECHNICAL FIELD

This patent disclosure relates generally to systems and methods for monitoring and managing client systems in a computing environment, and more particularly, to systems and methods for scanning one or more client computers to determine the health of and execute remedial operations on the client systems.

BACKGROUND

Various enterprises with expansive computing networks seek to have their client computers managed from a central location by an administrator or the like. These administration activities include, by way of example, distributing applications to the client computer systems, maintaining the client computer systems and upgrading and/or removing client applications from the central location. For this reason, different forms of management software are used to deliver and monitor application software and other services remotely from a server to the one or more client computers.

Asset management software is often used to protect software used in an organization and for conducting other software management tasks. This may include various forms of software acquisition and/or software inventory, installation of applications on the client computer systems within an organization, application of various policies to the installed base, and defining consequences for violations of the policies. One type of asset management software is Microsoft® Systems Management Server ("SMS") software. When installed, the SMS software creates several Windows Management Instrumentation ("WMI") namespaces to manage various sites within the organization. The client computers also require management software to be installed on the client machine.

Attempts to automate monitoring the health of client systems deployed on the network still require a degree of manual intervention and troubleshooting at the client computing system in order to remedy many encountered problems. For example, current SMS health services only provide a very high-level description of problems with client systems. That is, they now merely indicate whether the client system health is generally good or bad. They fail, however, to inform a system administrator as to the precise nature of the health problem or how it should be corrected.

BRIEF SUMMARY

The present disclosure relates to management software used in a computer network system and methods for deploying and executing customizable health service agents on a plurality of client computer systems (client nodes) in an enterprise computer network. The health service agent applies a task list comprising a set of tests for monitoring the status of software on the client nodes. The health service agents apply their customizable sets of tests to their respective client nodes and specify one or more health attributes based upon the outcome of the tests. Furthermore, the health service agents potentially take remedial actions to correct errors discovered by the applied tests. The health service agent also creates a health service event log entry. The health service agent submits the health service event log entry to a server for tabling in a health service event log.

In an exemplary embodiment, the health service agents include a client type-specific portion comprising a task list. The task list, for example, includes a set of rules (tests) and executables that the health service agents apply to their respective client nodes. A health service database server provides the client type-specific portion to a health service agent in response to a query from the health service agent that identifies a particular client type. The health service agent incorporates the client type-specific portion provided by the database server into its task list. The health service agent applies the task list to the client node to obtain a potentially very detailed indication of the client node health and thereafter execute a remedial operation that is also specified by the task list.

BRIEF DESCRIPTION OF THE DRAWINGS

FIG. 3 is a flowchart summarizing steps undertaken by a health service client to carry out diagnostic monitoring and remedial actions on a client node according to the disclosure.

DETAILED DESCRIPTION

Figure 1:
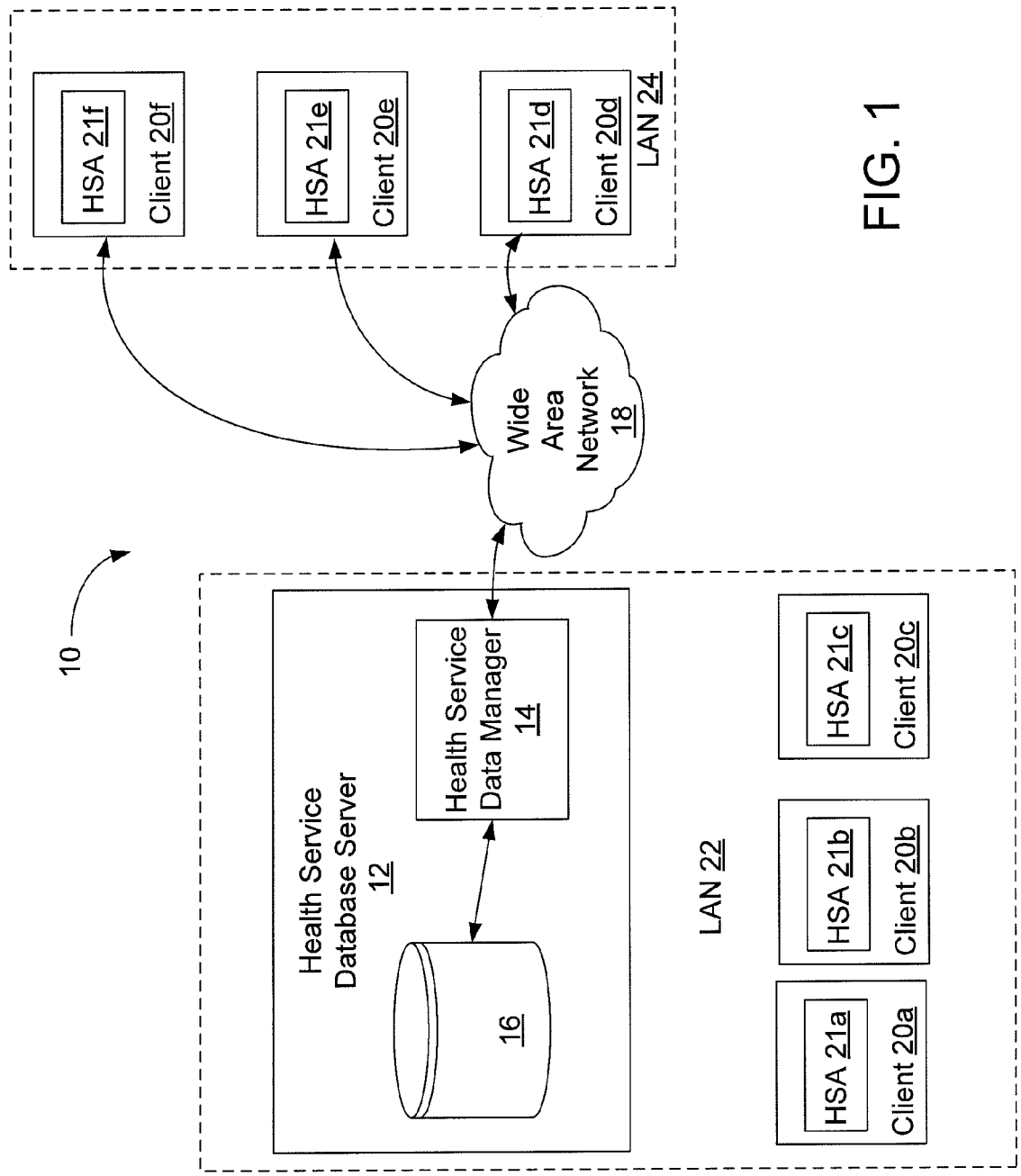
FIG. 1 is a functional block diagram representation of a system including an enhanced client health monitoring tool according to the disclosure.

Before turning to the figures, a summary of an exemplary system and method is provided. This disclosure relates, by way of example, to a system and method for enterprise network-wide monitoring of the health and operability of applications and other software resident at various computing nodes on the enterprise network. Client health service agent modules are initially deployed to client nodes on the enterprise network. After deployment to a particular client node, the health service agent modules are supplemented/customized based upon the type of client node (e.g., a logged-on user's group/classification) to which the particular agent modules are deployed. The supplement includes particularized tasks, defined for example by a set of rules and executables, performed by the deployed health service agent on the associated client node.

The health service agent, customized according to the identified client node type, executes on the client node and renders a set of client health status attributes. The health status attributes provide detailed information regarding the health of the client system including, for example, whether the client node contains particular installed software, proper versions of software and whether the software is currently running. Other potential tests (rules) applied by the health service agent relate to the configuration and running status (e.g., enabled/disabled) of software and services operating on a particular client node upon which the health service agent operates. Yet other potential tasks performed on installed software on the client node relate to usage of the installed software including the last time the software and/or the amount of use (e.g., number of days used, number of starts, total elapsed time) over a specified time period. The types of tasks/tests applied by the health service agent on a client node is extensible and is intended to cover a wide variety of system administrator needs to monitor the health of computing nodes in an enterprise network.

The health service agent also includes, by way of example, executable instructions enabling the health service agents to initiate/perform a remedial task in response to a detected error condition on the client node. For example, the health service agent may re-enable/restart anti-virus or firewall applications. Another function carried out by the illustrative health service agent comprises transmitting a health data message (database write request) to a health service database. The health data message contains, for example, discovered health attributes, remedial operations performed by the agent, and results of the remedial operations on the client system.

The health service database maintains one or more tables supporting client health services carried out by the health service agents on their respective client nodes. In the illustrative embodiment described herein, the health service database supports supplementing/updating deployed health service agent task definitions. By way of example, the task definitions include rules (e.g., health determination and remedial logic) and executables (e.g., scripts, plug-ins, etc.) that facilitate detecting/fixing errors in the current state of a client node upon which a health service agent operates. The health service database also supports logging/storing the content of health data messages received from the health service agents operating on the client nodes within the enterprise network.

FIG. 1 illustratively depicts an exemplary environment in which a client health monitoring service, summarized herein above, operates. The above-summarized client health monitoring system operates, for example, within a commercial enterprise's computer network 10 to manage the health status of potentially thousands of computing devices, such as client nodes. Specifically, the illustrated computer network 10 includes a first client node 20a, a second client node 20b and a third client node 20c connected via a first local area network (LAN) 22. The computer network 10 further includes a fourth client node 20d, a fifth client node 20e and a sixth client node 20f connected via a second local area network (LAN) 24 and a wide area network (WAN) 18. The network computing environment in the illustrative example includes a health service database server 12 coupled to the first LAN 22. The health service database server 12 comprises a database application, identified herein as a health service data manager 14, and a health service data storage device 16. The health service data manager 14 is, by way of example, a MICROSOFT SQL database server application. The health service data storage device 16 is, for example, a hard drive or set of hard drives, but can be any of a variety of readable/writeable data storage devices.

In the illustrative example, each of the first client node 20a, the second client node 20b, the third client node 20c, the fourth client node 20d, the fifth client node 20e, and the sixth client node 20f contains a deployed copy of a health service agent, illustrated as a first health service agent 21a, a second health service agent 21b, a third health service agent 21c, a fourth health service agent 21d, a fifth health service agent 21e, and a sixth health service agent 21f, respectively, as described herein above in the summary of the disclosure. Thus, by way of example, the first health service agent 21a deployed on the first client node 20a comprises a scheduled executable program module that is periodically invoked within the first client nodes 20a.

The first health service agent 21a executes a set of computer system health-related tasks in accordance with an extensible/customizable set of rules and executables maintained/provided by the health service database server 12. On each particular one of the client nodes (i.e., first client node 20a, second client node 20b, third client node 20c, fourth client node 20d, fifth client node 20e and sixth client node 20f), a copy of the health service agent (first health service agent 21a, second health service agent 21b, third health service agent 21c, fourth health service agent 21d, fifth health service agent 21e and sixth health service agent 21f), customized according to a type assigned to each particular node, executes the scheduled task list, notes any potential health issues relating to the operational state (including configurable parameters, version, execution status, etc.) of software on the particular client node, initiates corrective actions (based upon a specified rule and/or executable), and sends a message to the health service database server 12 describing one or more logged events associated with the periodically executed health service agent on the client node.

In the illustrative example depicted in FIG. 1, the health service database server 12, residing on the first LAN 22, communicates via the WAN 18 to one or more client nodes (i.e., the fourth client node 20d, fifth client node 20e, sixth client node 20f) residing on the second LAN 24. While not expressly depicted in FIG. 1, such connections are supported, for example, by gateways/routers that physically link each of the first LAN 22 and the second LAN 24 to the WAN 18. It should be understood that the arrangement and content of the computer network 10 is merely exemplary. For example, while a single health service database server 12 is depicted in FIG. 1, in alternative embodiments multiple copies of the health service database server 12 are installed at various locations (e.g., distinct geographic sites) throughout an enterprise network. In such embodiments, each of the health service database server 12 instances includes an identical copy of the rules and executables defining customized task lists for particular client node types. However, each health service database server 12 instance maintains event logs associated with particular client nodes assigned to the particular health service database server 12 instance. In view of the above, it will be apparent that the disclosed system is potentially implemented in a variety of ways. The specific arrangement and content of a system that implements various features of the disclosure will vary depending on the particular needs associated with various components that are present in computer networks implementing the disclosed system.

Figures 2, 4:
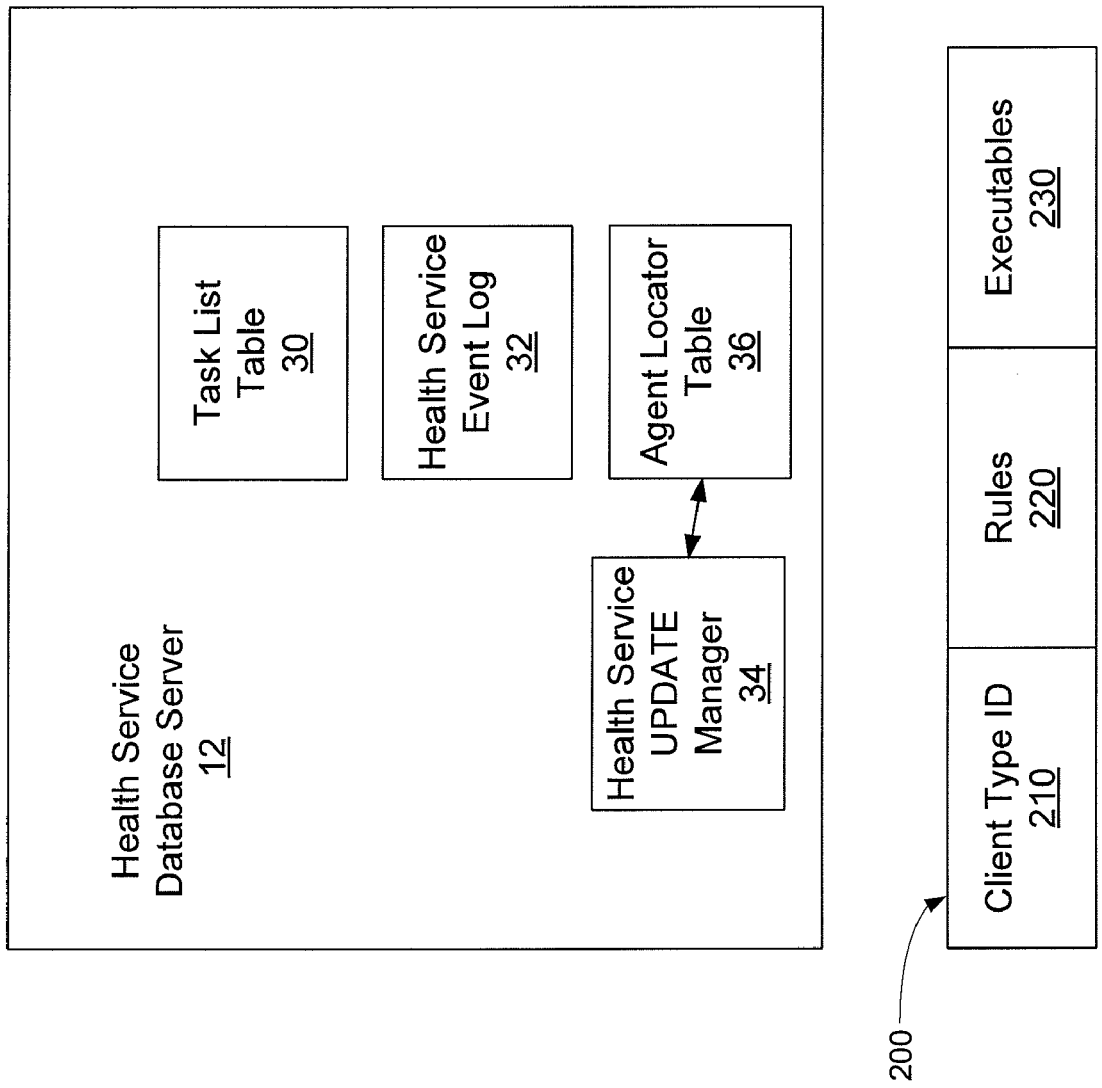
FIG. 2 is a block diagram representing a database server supporting needs of health service agents located on one or more client nodes according to the disclosure.
FIG. 4 is a data table illustrating an exemplary health service client type-specific portion of a task list definition for a health service agent containing client health rules and associated executables.

FIG. 2 provides an exemplary summary of the information maintained by the health service database server 12. In the exemplary embodiment, the health service database server 12 comprises a task list table 30 comprising a set of task list records defining a customized portion of executable tasks for each health service agent. In an exemplary embodiment, each record of the task list table 30 includes a client type ID field and a task list specifying a set of rules and executables to be applied by health service agents operating on client nodes of the identified client type. The content of the task list table 30 records described herein is exemplary. Different record information is maintained within the records of the task list table 30 in accordance with alternative embodiments of the health service database server 12.

The health service database server 12 also includes a health service event log (table) 32. In an exemplary embodiment, each event record within the health service event log 32 includes identification information such as, for example, a message source ID (e.g., a unique ID assigned to originating health service agent), a timestamp, a task list version applied, etc. The event records thereafter identify information associated with the results of health service tasks performed by the identified health service agent in accordance with the specified task list version. The task results include, by way example, a series of test IDs, results (error/ok), remedial tasks initiated by the health service agent, and results of the remedial tasks. The content of the event log record described herein is exemplary. Different record information is maintained within the records of the health service event log 32 in accordance with alternative embodiments of the health service database server 12.

Updating the customizable (task list) portion of individual instances of health service agents (such as the first health service agent 21a) running on networked client nodes (such as the first client node 20a) is supported in illustrative embodiments. In a particular embodiment, an administrator specifies new customizable portions of the first health service agent 21a by updating the content of the task list table 40 records of affected client node types. Various update mechanisms are potentially invoked to provide an updated version of a task list's rules and executables to effected client nodes. For example in accordance with embodiments incorporating a "push" update mechanism, a health service update manager 34 consults an agent locator table 36 including a set of registered health service agent records. Each agent record includes, for example, a health service agent ID, client node ID, and a current client node type ID. In embodiments utilizing a "push" update mechanism, the health service update manager 34, in response to notification that a task list entry (for a particular client node type) in the table 30 was updated, consults the agent locator table 36. The health service update manager 34 initiates an update process for each deployed health service agent corresponding to a record in the locator table 36 that identifies the updated client node type.

Alternatively, a "pull" update mechanism is implemented for updating the customizable task lists associated with particular client node types upon which the health service agents reside and operate. In embodiments utilizing a pull mechanism, each of the deployed copies of health service agents, in response to an event, queries the health service database server 12 with regard to whether an update is needed. By way of example, the first health service agent 21a, upon being invoked, submits a database query to the health service database server 12 specifying the current version ID (e.g., number, timestamp) associated with the task list for a specified node type. If the task list version for the identified node type provided by the first health service agent 21a matches the current version of the corresponding entry in the task list table 30, then the task list is not updated. However, if the version IDs differ, then the task list of the requesting health service agent (in this case the first health service agent 21a) is replaced by the current version of the task list identified in the task list table 30. The above-described methods of updating the customizable portion of health service agents are merely exemplary. Those skilled in the art will appreciate that the rules and executables associated with health service agents can be carried out in a variety of ways.

FIG. 3 is a flowchart summarizing an exemplary set of steps executed by a copy of health service agents. By way of example, the first health service agent 21a is invoked, for example, by a task scheduler utility on the first client node 20a upon which at least a shell version of the first health service agent 21a was previously installed. In alternative embodiments the first health service agent 21a is implemented as an executable component on a start-up script that specifies a set of stand-alone applications. In yet other embodiments, health service agents are executed when an end user logs onto client systems within a network so that scripting languages are run from a networked server computer. In each of the exemplary arrangements for starting up health service agents, such as the first health service agent 21a, the health service agent then handles scanning of the client system, such as the first client node 20a, and updating appropriate health service log entries as appropriate.

Turning to the steps summarized in FIG. 3, at a decision step 100, if the first health service agent 21a determines that this is the first invocation of the first health service agent 21a instance on the first client node 20a, then control passes to a query step 110. At the query step 110 a shell (default) version of the first health service agent 21a submits a query to the health service database server 12 to retrieve a client node type-specific task list from a table having a set of client-type specific task list records (see, FIG. 4 described herein below) identified by client node type. The query includes a client node type previously assigned to the client node (such as the first client node 20a) upon which the invoked health service agent resides. The task list returned by the health service database server 12 comprises, for example, a set of rules and executables associated with a particular entry in the task list table 30. The returned task list is incorporated into the first health service agent 21a. In a separate (or associated) query carried out during the query step 110, the first health service agent 21a provides further descriptive data to the health service database server 12 relating to the first client node 20a, such as machine name, IP address and perhaps other indicia such as a type of user (or users) configured on the first client node 20a. The further descriptive data is used to create (or update) an entry in the agent locator table 36 corresponding to the new/updated first health service agent 21a. Upon completing the query step 110, a fully functional, client type-specific instance of the first health service agent 21a resides on the first client node 20a, and control passes to an execution step 120. Alternatively, if the first health service agent 21a invoked on the first client node 20a already contains the customized task list portion, then control passes from the decision step 100 to the execution step 120.

At the execution step 120, the invoked instance of the first health service agent 21a determines the health status of the first client node 20a. In the illustrative embodiment, the first health service agent 21a executes its task list, comprising a default task listing augmented/customized by rules and executables obtained during the query step 110. The task list potentially comprises any of a variety of rules-driven tests including, by way of example, testing for: installed software (applications, modules, plug-ins, etc.), installed software versions, configurations of software/hardware (e.g., firewall settings), whether the software (e.g., MICROSOFT SMS) is running, whether the software is enabled/disabled (e.g., a firewall), and software usage (e.g., last used, how frequently used, how often used, etc.). In the exemplary embodiment, the results of the test, saved in the form of health attribute values. The task list also supports specifying executables, operations and/or commands carried out on the client system in view of the rules-driven test results. Potential actions taken by the first health service agent 21a in view of the test results include setting a new configuration, enabling/disabling a function, installing a new version, uninstalling software, etc.

In illustrative embodiments, scheduling execution of particular tasks within a task list is highly customizable. By way of example, each rule within the task list specifies a task-specific schedule for executing a particular task/test. Thus, when the first health service agent 21a is invoked (according to a first event criterion), the first health service agent 21a accesses a task-specific schedule descriptor specified by individual tasks within the task list. The descriptor is provided in a variety of forms including: a specific time/period, an event (e.g., each time the first health service agent 21a is invoked), a task classification to which an administrator assigns a time/period (e.g., frequent, infrequent, etc.), an event counter (every Nth computer restart), etc.

Next, at a compilation step 130 the first heath service agent 21a compiles, if needed, an event log entry summarizing the test results, actions taken, and the effect of the actions taken by the first health service agent 21a. In an exemplary embodiment the event log entry further comprises information identifying the first client node 20a, timestamp associated with a particular task list execution, an alarm status indicator (drawing a user or operator's attention to a particular health issue on the client node), etc.

During a final step 140, the first health service agent 21a stores the event log entry. By way of example, a local health service log is updated to include an entry corresponding to the particular iteration of the task list execution. The first health service agent 21a also transmits the event log entry in the form of a message to the health service database server 12 to facilitate storing an appropriate event log record in the health service event log 32. In an exemplary embodiment the first health service agent 21a initiates establishing a connection with the health service database server 12. The first health service agent 21a thereafter submits a write request to the health service database server 12 including data corresponding to the iteration of the task list. Upon receipt of the write request the health service database server 12 tables the data within a new record in the health service event log 32.

The manner of invoking/hosting health service agents, such as the first health service agent 21a on the first client node 20a, differs in accordance with various embodiments of the described client health service system. The first health service agent 21a is described, by way of example, herein above as a scheduled task managed by a task scheduler utility. The task scheduler utility invokes applications, including the first health service agent 21a, on a scheduled basis. In alternative embodiments the first health service agent 21a operates continuously as a background process on the first client node 20a. The continuously executing health service agent in this example maintains an execution schedule with regard to its task list and applies task-specific rules to individual entries within the task list according to schedules specified by individual task list entries or any other task execution timing scheme.

Having described an exemplary set of steps performed by the first health service agent 21a to apply a task list to the first client node 20a, attention is directed to FIG. 4 containing a summary/schematic view of an exemplary task list record 200 structure for the task list table 30. A record within the task list table 30 is accessed during the query step 110 to provide a client type-specific portion of a task list for a particular client node with which the health service agent is associated. In the exemplary embodiment, each record/entry within the data table 30 includes a client type identifier field 210. A value in the client type identifier field 210 specifies a particular class of client node for which a client type-specific portion of the health service agent is to be provided. The value stored within the client type identifier field 210 is specified in a number of ways, in accordance with various embodiments, to support designation of particular client types. In an exemplary embodiment, a simple class ID string/value is assigned to a particular class. Alternative embodiments specify a client type ID as a set of descriptive identifier values that, in combination, specify a particular client class. In such embodiments each defining trait of a potential client class corresponds to a sub-field of the client type identifier field 210 (e.g., sub-field 1 specifies whether the node contains at least one networked server application, sub-field 2 specifies the most privileged/restricted user supported by the client node, etc.).

A rules field 220 specifies a set of rules associated with tests performed by health service agents, such as the first health service agent 21a, in association with client-specific portion of a task list. In an exemplary embodiment, the rules field 220 contains a set of rules identifiers that are used to access records within a rules table (not shown). Each rules table entry, in turn specifies a rule/test to be applied by a task list execution engine incorporated within health service agents, such as the first health service agent 21a. Thus in the illustrative embodiment, once a particular rule is defined and placed in the rules table, the rule can be used by multiple task list entries within the task list table 30.

Finally, an executables field 230 specifies a set of executables that are potentially applied by health service agents, such as the first health service agent 21a, to client nodes, such as the first client node 20a, in association with applying a particular rule. In an exemplary embodiment, rather than contain actual executables, the executables field 230 contains identifiers for executables defined in detail within entries of an executables table (not shown). The executables are presented in a variety of ways including, for example, commands (including a path to a file name), scripts, machine-executable instructions, configuration settings, etc.

The rules specified by the rules field 220 of entries within the task list table 30 enable health service agents, such as the first health service agent 21a, to execute tests on client nodes, such as the first client node 20a, according to a specified sequence of tasks/instructions. Such tasks/instructions are potentially provided from yet other locations. For example, the first health service agent 21a executes a script associated with a rule or set of rules. The script, when executed by the first health service agent 21a, in turn specifies a software module (e.g., a plug-in or DLL) provided by a shared network file/resource server. Indirectly identifying the rules enables an enterprise network administrator to update the executable rules without having to deploy updated versions of the client-specific part of the first health service agent 21a.

The indirect specification described above for rules is also applicable to the executables specified in the executables field 230. Thus, the executables field 230 of records within the task list table 30 may provide indexes to various executable files or command instructions. In this regard, it should be understood that the executables field 230 may include indexes to one or more executable files and/or commands as appropriate. Specifically, the executables may include virtually any type of remedial/reporting actions carried out by the first health service agent 21a in association with applied rules.

INDUSTRIAL APPLICABILITY

The industrial applicability of the health monitoring process used to monitor the health of a client node/machine to determine whether it is functioning properly will be readily appreciated from the foregoing discussion. As described, a health monitoring process and service carried out by an agent customized according to a query of a centralized database may be performed in response to events, including a timer that expires at regular intervals, to apply rules and executable code to detect and thereafter attempt to resolve any client problems. An event log records the results of the operation of the client node health monitor. Thus, the method may be performed without substantial human intervention at each of the client machines. Advantageously, updated rules and executables may be readily deployed to a centralized database without concern of distribution to all other machines disposed on a computing network.

The present disclosure is applicable to detect whether health problems exist on a variety of health service client nodes of various types operating in various computing environments. That is, with appropriate modification of the method or task list, the condition of client machines employed in different network configurations may be determined. The present disclosure provides a relatively low maintenance cost utility/component for closely monitoring the configuration and operation of client nodes as well as modifying the content of such tests and the remedies applied to error conditions detected during the tests.

The foregoing description provides examples of the disclosed health monitoring method and service. Other implementations of the disclosed principles are likely to differ in implementation detail from the foregoing examples. All discussions of specific examples are intended to reference the particular example being discussed at that point and are not intended to imply any limitation as to the scope of the present disclosure more generally.

Accordingly, the disclosed innovations include all architectural modifications and equivalents of the subject matter recited in the claims appended hereto as permitted by applicable law. Moreover, any combination of the above-described steps and elements in all possible variations thereof is encompassed unless otherwise indicated herein or otherwise clearly contradicted by context.

We claim:

1. A method for monitoring the health of a client node in a computer network by a health service agent located on the client node, the method comprising the steps of:
    issuing a request to a server for a client type-specific task list to be incorporated into the client node;
    incorporating the client type-specific task list into the health service agent, the client type-specific task list supplementing a shell version of the health service agent;
    executing the client type-specific task list on the client node to render one or more health attribute values for the client node; and
    storing the health attribute values in an event log.

2. The method of claim 1 further comprising the steps of transmitting the event log to the server, and tabling the event log as a record within a health service event log maintaining event log records for client nodes in the computer network.

3. The method of claim 1 wherein the task list specifies rules and the executing step comprises applying the rules to the client node to render the one or more health attribute values.

4. The method of claim 3 wherein the task list specifies executables that support one or more actions taken by the health service agent to correct an error specified in the one or more health attribute values.

5. The method of claim 4 wherein the storing step further comprises tabling a summary of operations performed to correct the error specified in the health attribute values.

6. The method of claim 5 wherein the storing step further comprises tabling a summary of results of the operations performed to correct the error specified in the health attribute values.

7. The method of claim 4 wherein the rules specify a test associated with a software component running on the client node.

8. The method of claim 7 wherein the executables initiate a remedial action wherein an operational mode of the software component is changed.

9. The method of claim 8 wherein the executables initiate a remedial action wherein a specified version of the software component is installed on the client node.

10. The method of claim 1 wherein the rules specify a test associated with a hardware configuration of the client node.

11. A system for monitoring the health of a client node in a computer network, the system comprising:
    a health service database server located remotely from the client node, the health service database server comprising a task list table includes a set of client-type specific task lists; and
    a health service agent located on the client node, the health service agent comprising computer executable instructions facilitating performing the steps of:
        issuing a request to the health service database server for a client type-specific task list to be incorporated into the client node,
        incorporating the client type-specific task list received by the client node into the health service agent, the client type-specific task list supplementing a shell version of the health service agent,
        executing the client type-specific task list on the client node to render one or more health attribute values for the client node, and
        storing the health attribute values in an event log.

12. The system of claim 11 further comprising a health service event log for maintaining event log records for client nodes in the computer network, and wherein the health service agent further comprises computer executable instructions facilitating performing the steps of transmitting the event log to the health service database server and wherein the health service database server tables the event log as a record within a health service event log.

13. The system of claim 11 wherein the task list specifies rules and the executing step comprises applying the rules to the client node to render the health attribute values.

14. The system of claim 13 wherein the task list specifies executables that support one or more actions taken by the health service agent, during the executing step, to correct an error specified in the health attribute values.

15. The system of claim 14 wherein the event log record comprises a summary of operations performed to correct the error specified in the health attribute values.

16. The system of claim 15 wherein the event log record further comprises a summary of results of the operations performed to correct the error specified in the health attribute values.

17. The system of claim 14 wherein the rules specify a test associated with a software component running on the client node.

18. The system of claim 17 wherein the executables initiate a remedial action wherein an operational mode of the software component is changed.

19. The system of claim 18 wherein the executables initiate a remedial action wherein a specified version of the software component is installed on the client node.

20. The system of claim 11 wherein the rules specify a test associated with a hardware configuration of the client node.

21. The system of claim 11 wherein the health service agent performs the executing step on a periodic basis.

* * * * *